United States Patent
Roberson

(10) Patent No.: US 6,446,790 B1
(45) Date of Patent: Sep. 10, 2002

(54) LINK FOR SHARP CHAIN CONVEYOR

(75) Inventor: Russell K. Roberson, Russellville, AR (US)

(73) Assignee: Omega Solutions, Inc., Russellville, AR (US)

( * ) Notice: Subject to any disclaimer, the term of this patent is extended or adjusted under 35 U.S.C. 154(b) by 75 days.

(21) Appl. No.: 09/783,685

(22) Filed: Feb. 14, 2001

(51) Int. Cl.⁷ ............................................... B65G 13/02
(52) U.S. Cl. .................... 198/692; 144/245.2; 198/663; 198/834
(58) Field of Search ................ 198/692, 693, 198/834; 144/245.2

(56) References Cited

U.S. PATENT DOCUMENTS

| | | | |
|---|---|---|---|
| 208,321 A | * | 9/1878 | Lemieux ..................... 198/692 |
| 223,904 A | * | 1/1880 | Gleason ...................... 198/692 |
| 356,973 A | * | 2/1887 | Allman ........................ 198/692 |
| 885,959 A | * | 4/1908 | Schilleman ................. 198/692 |
| 3,858,713 A | * | 1/1975 | Allen .......................... 198/692 |
| 4,881,584 A | | 11/1989 | Wislocker et al. |
| 4,886,156 A | | 12/1989 | Records et al. |
| 5,385,186 A | | 1/1995 | Head, Jr. et al. |
| 5,765,617 A | | 6/1998 | Mierau et al. |
| 6,062,281 A | | 5/2000 | Dockter et al. |

OTHER PUBLICATIONS

*Sharp Chain Cross Section,* drawing, Nov. 10, 1994, Advanced Sawmill Machinery, Holt, Florida, 1 page.
*Link Assembly Sharp Chain,* drawing, Jun. 24, 1983, Kockums–Cancar Inc., 1 page.
*Rex 6.000 Pitch Block and Bar Chain with "S" Type Attachment,* drawing, Oct. 6, 1998, Rexnord Corp., 1 page.

* cited by examiner

Primary Examiner—Christopher P. Ellis
Assistant Examiner—Richard Ridley
(74) Attorney, Agent, or Firm—Ray F. Cox, Jr.

(57) ABSTRACT

A spiked H-style link for a sharp chain conveyor where the single centrally-placed saddle of the prior art is replaced by a double saddle with a centrally-located opening shaped to receive a sprocket tooth. The double saddle moves each saddle outward from the central portion of the spiked link to enhance the rigidity of the legs between which the connecting pins act. The legs are provided with a thickened offset step on the lower inner portion of each leg. There is a corresponding decrease in the thickness of the legs in the region where the connecting link works. By decreasing the thickness of the legs in the region outside the offset step, the connecting link may be widened, allowing for a greater bearing surface on the connecting pin and thus reducing the rate of wear on the connecting pin.

9 Claims, 4 Drawing Sheets

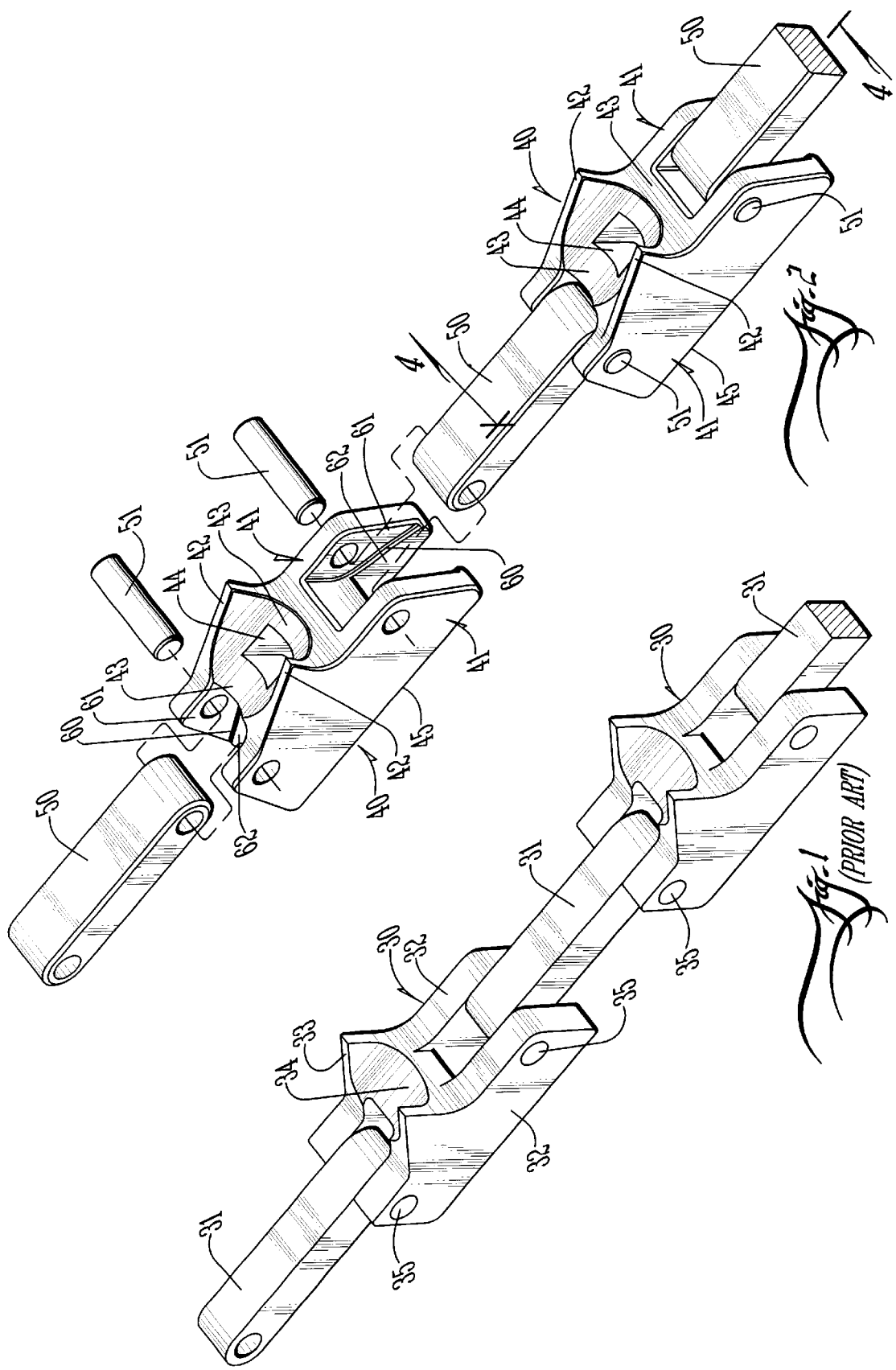

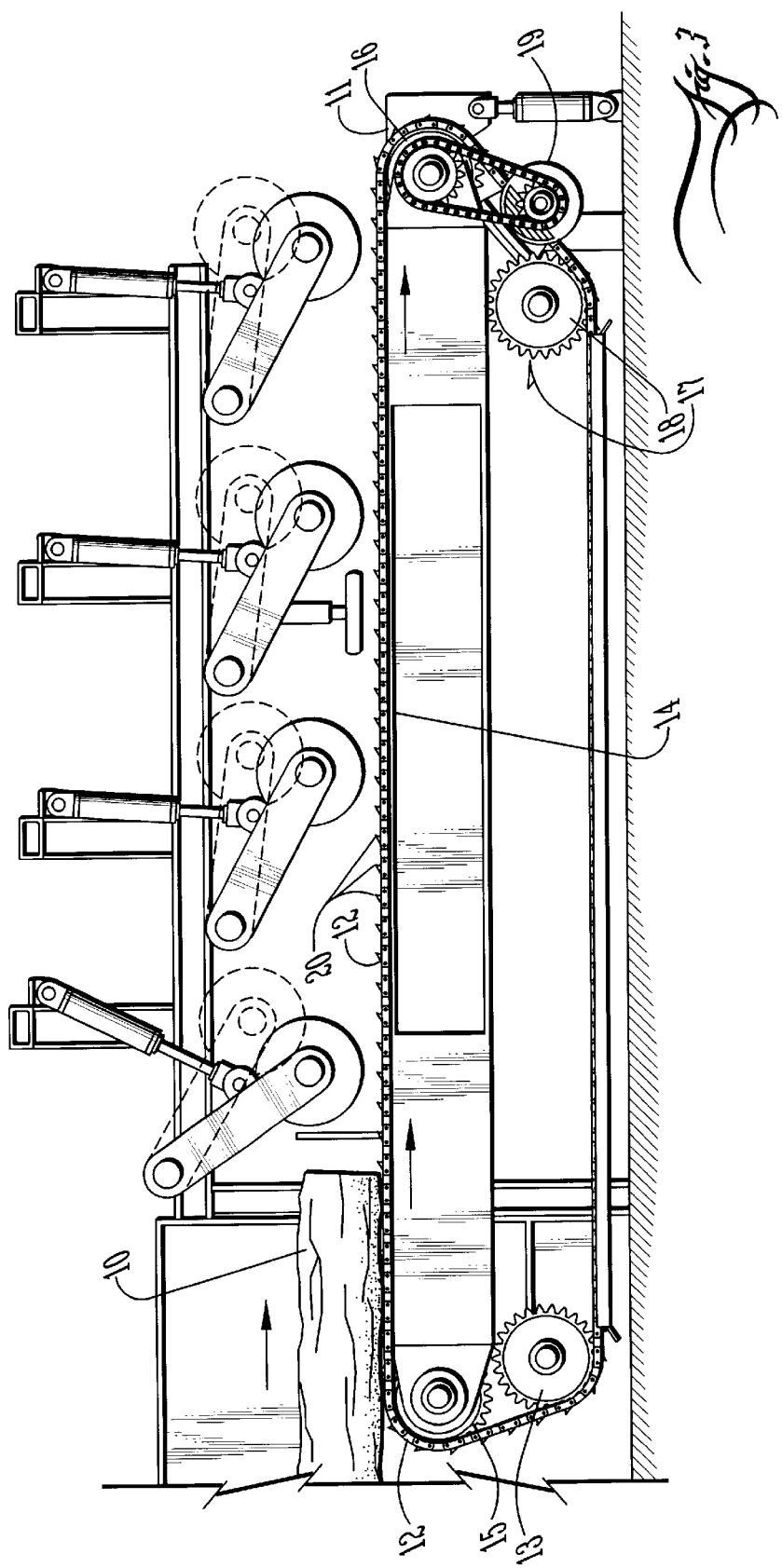

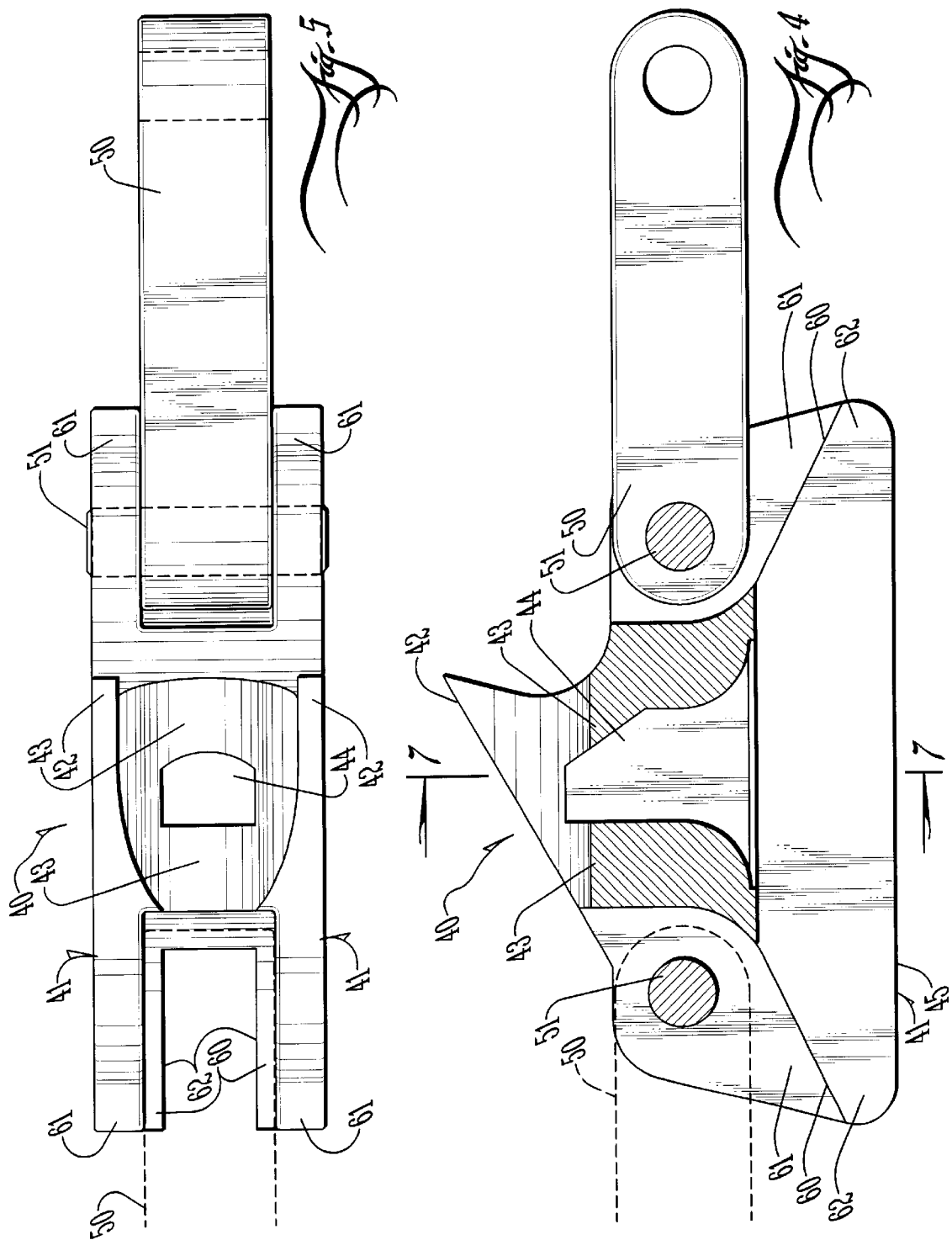

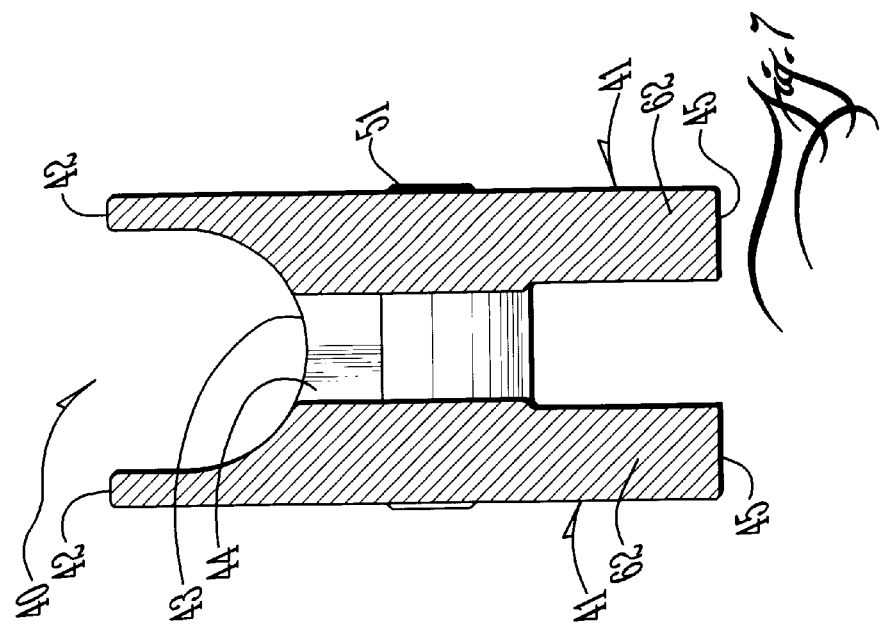
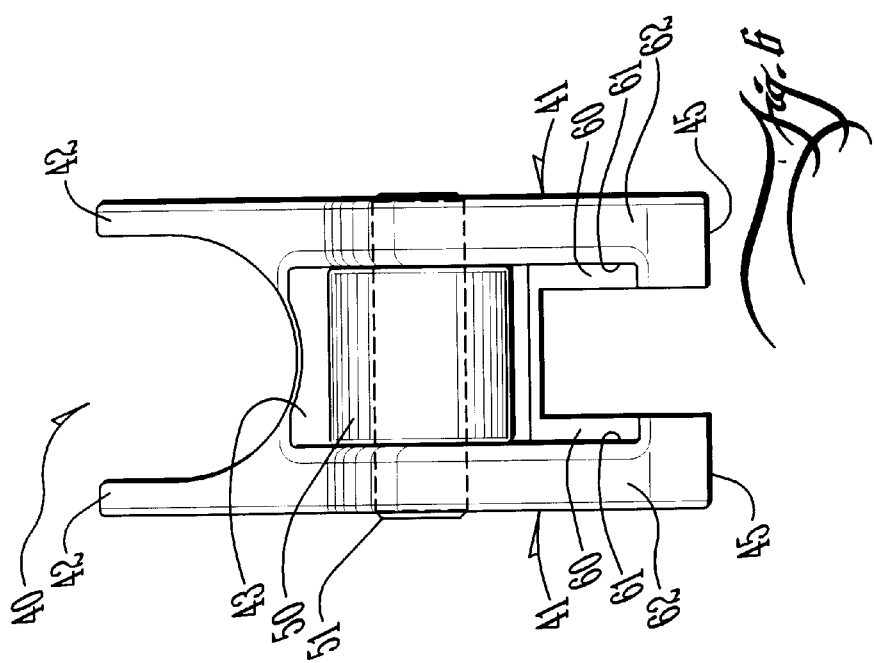

LINK FOR SHARP CHAIN CONVEYOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates to the links in an infeed conveyor for conveying logs into a saw in a sawmill, and in particular, to the links in a type of conveyor known as a sharp chain.

2. Brief Description of the Related Art

A conveyor known as a sharp chain is employed in sawmills to convey and feed logs into a saw. The sharp chain is typically a link-type chain in which alternating links have upstanding spikes for engaging the log and maintaining it in a fixed orientation. These links, referred to as spiked links or dog links, are connected by pins to connecting links. The whole forms an endless chain which is sprocket-driven. The endless chain passes around at least one infeed sprocket gear and at least one outfeed sprocket gear.

Examples of sharp chains are disclosed in U.S. Pat. Nos. 4,881,584; 5,765,617; 6,062,281; and 5,385,186.

An early form of spiked link for a sharp chain is disclosed in U.S. Pat. No. 4,886,156 to Records et al: In this style of sharp chain, the spiked link has a single leg which rides in a V-shaped guide. Lateral stability can be a problem with this type of link, which has been mostly supplanted by an H-style link. The H-style link has two legs connected by a centrally-located saddle. The H-style link improves the lateral stability of the sharp chain. Sharp chains incorporating the H-style link typically are driven by sprocket gears with teeth that bear against the ends of the connecting links or against the saddle. In the commonest form of spiked link, the sprocket teeth bear against the ends of the connecting links, which therefore puts considerable pressure on the pins that connect the connecting links to the spiked links. Since the pins have limited bearing area and are further subject to wear from rotational motion of the links as they pass around the sprocket gears, failures to the pins and the ends of the connecting links are a common problem.

An additional problem with the H-style spiked link is that the legs on either side of the saddle tend to exhibit excessive flexibility as a result of the central placement of the saddle and the limited rigidity that the relatively small saddle imparts to the spiked link. Such flexibility is undesirable in that the flexing of the legs contributes to wear and consequent failure of the connecting pins and connecting links.

The limitations of the prior art are overcome by the present invention as described below.

BRIEF SUMMARY OF THE INVENTION

The present invention is directed to an improvement in the design of a spiked link for a sharp chain conveyor. The spiked link of the present invention departs from the prior H-style design in that the single centrally-placed saddle is replaced by a double saddle with a centrally-located opening shaped to receive a sprocket tooth. The resulting center drive action for the spiked link avoids driving the chain from the ends of the connecting links and thus removes this source of failure for the connecting pins and connecting links.

Furthermore, the double saddle design moves each of the two saddles outward from the central portion of the spiked link. The distance between each saddle and the connecting pin is therefore reduced. This contributes to the rigidity of the legs between which the connecting pins act. With less flexion of the legs, the potential for the connecting pins to bind and wear is reduced.

A second feature of the present invention is that the legs are provided with an offset step on the inner portion of each leg. The offset step is defined by the portion of the legs where the connecting link never "works" during any portion of the chain's motion around the circuit of the sprocket gears. Since the connecting link never intrudes into this space, the offset step allows the legs in these areas to be thickened. This allows a corresponding decrease in the thickness of the legs in the region where the connecting link works. Since the width of the spiked link is fixed by the conventional size of sharp chains commonly employed in the industry, the thickness of the legs can only be decreased on the inner sides. By decreasing the thickness of the legs in the region where the connecting link works, the connecting link may be widened from the prior art connecting link. Significantly, this allows for a greater bearing surface on the connecting pin and thus reduces the rate of wear on the connecting pin and on the ends of the connecting links. By combining the thickened area of the offset steps and reducing the longitudinal distances of the legs between the saddles and the connecting pins, the legs retain sufficient stiffness and strength so that no problems are introduced by reducing the thickness of a portion of the legs to increase the bearing surface of the connecting pins.

It is therefore an object of the present invention to provide for an improved spiked link for a sharp chain conveyor in which the central saddle is replaced by a double saddle.

It is a further object of the present invention to provide for such an improved spiked link having an offset step allowing an increased width for the connecting link and a consequently greater bearing area for the connecting pin.

These and other features, objects and advantages of the present invention will become better Understood from a consideration of the following detailed description of the preferred embodiments and appended claims in conjunction with the drawings as described following:

BRIEF DESCRIPTION OF THE SEVERAL VIEWS OF THE DRAWINGS

FIG. 1 is a perspective view of a portion of a prior art sharp chain showing the prior art single saddle spiked link and prior art narrow connecting link.

FIG. 2 is a partially exploded perspective view of the sharp chain of the present invention showing the double saddle spiked link and the widened connecting link.

FIG. 3 is a side elevation view of a sharp chain conveyor with sprocket gears for driving the endless sharp chain.

FIG. 4 is a cross-section elevation view of the spiked link and connecting link of FIG. 2 taken along the line 44.

FIG. 5 is a top plan view of the spiked link and connecting link of FIG. 4.

FIG. 6 is a rear elevation view of the spiked link and connecting link of FIG. 5.

FIG. 7 is a cross-section front elevation view of the spiked link of FIG. 4 taken along the line 7—7.

DETAILED DESCRIPTION OF THE INVENTION

With reference to FIGS. 1–7, the preferred embodiment of the present invention may be described as follows.

FIG. 3 shows a typical conveyor for transporting a log 10 utilizing an endless sharp chain 11. The sharp chain 11 comprises alternating spiked links 12 and connecting links 13. The spiked links 12 have one or more upstanding spikes 20. The endless sharp chain 11 passes along a raceway 14 on which downwardly facing surfaces of the spiked links 12 bear. The raceway 14 lies between an infeed sprocket gear 15 and outfeed sprocket gear 16. Other sprocket gears 17 may also be employed to define the path around which the endless sharp chain 11 passes or to drive the sharp chain 11 or both. Each sprocket gear 15, 16, 17 comprises a plurality of sprocket gear teeth 18 which engage the sharp chain 11. A power source, for example a motor 19, drives one or more of the sprocket gears 15, 16, 17 to move the sharp chain 11. In operation, the log 10 is placed upon the upper surface of the sharp chain 11 where the log 10 is engaged by the spikes 20 on the spiked links 12. The log 10 is thus transported along the length of the raceway 14 between the infeed sprocket gear 15 and the outfeed sprocket gear 16 while the weight of the log 10 is transmitted through the sharp chain 11 to the supporting raceway 14.

The prior art sharp chain is described with reference to FIG. 1. The prior art sharp chain comprises alternating single-saddle spiked links 30 and narrow connecting links 31. The prior art spiked link 30 comprises a pair of legs 32, each of which has an upstanding spike 33. The legs 32 are connected by a single centrally-located saddle 34. The spiked links 30 are connected to the connecting links 31 by connecting pins 35. The connecting links 31 are free to rotate about the pins 35 so that the endless sharp chain is able to flex as it passes around its path on the conveyor as defined by the sprocket gears 15, 16, 17. In order to drive the prior art sharp chain, each tooth 18 of the sprocket gear is set to bear against the end of a respective connecting link 31. This produces considerable stress on the end of the connecting link 31 and the pin 35.

The improved sharp chain and spiked link of the present invention are described with reference to FIGS. 2 and 4–7. The sharp chain comprises alternating spiked links 40 and connecting links 50 connected by connecting pins 51, around which the connecting link 50 is free to rotate. The improved spiked link 40 comprises a pair of legs 41, each having an upstanding spike 42 and downwardly facing surfaces 45 to bear against the raceway 14. Rather than the single centrally-placed saddle 34 of the prior art, the spiked link 40 has two saddles 43 connecting the legs 41. The space between the two saddles 43 defines an opening 44 for receiving a sprocket gear tooth (not shown). The sharp chain of the present invention is therefore driven by the pressure of the sprocket gear tooth against one or both of the saddles 43 rather than against the end of the connecting link 50. Further, the saddles 43 are placed outwardly from the center of the spiked link 40. The distance between each saddle 4 3and the connecting pin 51 is therefore reduced. This contributes to the rigidity of the legs 41 between which the connecting pin 51 is placed. With less flexion of the legs 41, the potential for the connecting pin 51 to bind and wear is reduced.

The legs 41 are provided with an offset step 60 on the inner side of each leg 41. The offset step 60 is defined by a first region 61 of the inner side of the legs 41 where the connecting link 50 "works" by rotating upwardly and downwardly during the sharp chain's motion around the circuit of the sprocket gears. Since the connecting link 50 never intrudes outside this first region 61 of the inner side of the legs 41, the offset step 60 allows the legs 41 to be thickened in a remaining second region 62. This allows a corresponding decrease in the thickness of the legs 41 in the first region 61 where the connecting link 50 works. Since the width of the spiked link 40 is fixed by the conventional size of sharp chains commonly employed in the industry, the thickness of the legs 41 can only be decreased on the inner sides. By decreasing the thickness of the legs 41 in the first region 61 where the connecting link 51 works, the connecting link 50 may be widened from the prior art connecting link 31. Significantly, this allows for a greater bearing surface on the connecting pin 51 and thus reduces the rate of wear on the connecting pin 51 and on the ends of the connecting links 50. By combining the thickened area of the second region 62 and reducing the longitudinal distances of the legs 41 between the saddles 43 and the connecting pins 51, the legs 41 retain sufficient stiffness and strength so that no problems are introduced by reducing the thickness of the first region 61 of the legs 41 to increase the bearing surface of the connecting pins 51.

The present invention has been described with reference to certain preferred and alternative embodiments that are intended to be exemplary only and not limiting to the full scope of the present invention as set forth in the appended claims.

What is claimed is:

1. In a conveyor chain for transporting logs along the length of a chain raceway, the conveyor chain comprising an endless of interconnected links traversing a path defined between at least one infeed sprocket gear and at least one outfeed sprocket gear, the sprocket gears having at least one tooth for engaging the links, the links comprising alternating spiked links and connecting links connected by connecting pins, the improvement comprising:

a spiked link comprising a pair of legs having downwardly-facing surfaces for bearing against-said raceway, a centrally-disposed opening for receiving a sprocket tooth, a forwardly-disposed saddle disposed between said centrally disposed opening and a forward portion of said pair of legs, and a rearwardly-disposed saddle disposed between said centrally-disposed opening and a rearward portion of said pair of legs.

2. The improvement of claim 1 wherein said spiked link further comprises a first region of each of said pair of legs and a second region of each of said pair of legs, said first region having a first thickness and said second region having a second thickness, such that together said first thickness and said second thickness define an offset step in an inner side of each of said pair of legs.

3. The improvement of claim 2 wherein said first regions comprise those portions of said pair of legs between which an adjacent connecting link works while said chain is traversing said path.

4. The improvement of claim 3 wherein said first thicknesses are less than said second thicknesses.

5. The improvement of claim 4 wherein a connecting link is disposed between said first regions and further wherein said connecting link is characterized by a connecting link width greater than an offset width defined between said second regions.

6. A spiked link for a conveyor chain for transporting logs along the length of a chain raceway, the conveyor chain comprising an endless loop of interconnected links traversing a path defined between at least one infeed sprocket gear and at least one outfeed sprocket gear, the sprocket gears having at least one tooth for engaging the links, the links comprising alternating spiked links and connecting links connected by connecting pins, comprising:

a pair of legs having downwardly-facing surfaces for bearing against said raceway, a centrally-disposed opening for receiving a sprocket tooth, a forwardly-disposed saddle disposed between said centrally disposed opening and a forward portion of said pair of legs, and a rearwardly-disposed saddle disposed between said centrally-disposed opening and a rearward portion of said pair of legs.

7. The spiked link of claim 6 further comprising a first region of each of said pair of legs and a second region of each of said pair of legs, said first region having a first thickness and said second region having a second thickness, such that together said first thickness and said second thickness define an offset step in an inner side of each of said pair of legs.

8. The spiked link of claim 7 wherein said first regions comprise those portions of said pair of legs between which an adjacent connecting link works while said chain is traversing said path.

9. The spiked link of claim 8 wherein said first thicknesses are less than said second thicknesses.

* * * * *